United States Patent [19]

Hill et al.

[11] 4,296,546

[45] Oct. 27, 1981

[54] APPARATUS FOR ASSEMBLING ELECTROCHEMICAL CELL

[75] Inventors: Michael S. Hill; David A. Poff, both of Gainesville, Fla.

[73] Assignee: General Electric Company, Gainesville, Fla.

[21] Appl. No.: 12,659

[22] Filed: Feb. 15, 1979

[51] Int. Cl.³ .............................................. B23P 19/04
[52] U.S. Cl. ........................................ 29/730; 29/234; 29/252
[58] Field of Search .................... 29/730, 731, 623.1, 29/252, 234, 222, 244, 235; 53/257, 261, 530

[56] References Cited

U.S. PATENT DOCUMENTS

| 1,430,728 | 10/1922 | Olaneta | 29/730 |
| 1,572,801 | 2/1926 | Kearney | 29/222 |
| 1,623,799 | 4/1927 | McCarthy | 29/222 |
| 1,745,374 | 2/1930 | Leutwyler | 29/222 |
| 2,031,005 | 2/1936 | Renfroe | 53/257 |
| 2,220,362 | 11/1940 | Anderson | 53/261 |
| 2,697,870 | 12/1954 | Zucker | 29/222 |
| 2,807,081 | 9/1957 | Black | 29/252 |
| 2,946,166 | 7/1960 | Baxter | 53/530 |
| 3,011,297 | 12/1961 | McDevitt | 53/261 |
| 3,104,609 | 9/1963 | Crawford | 53/530 |
| 3,727,374 | 4/1973 | Williams | 53/261 |
| 4,136,431 | 1/1979 | Tucker | 29/234 |

FOREIGN PATENT DOCUMENTS

| 124117 | 2/1949 | Sweden | 29/222 |
| 174722 | 1/1922 | United Kingdom | 29/222 |
| 229277 | 8/1925 | United Kingdom | 29/222 |

*Primary Examiner*—Daniel C. Crane
*Attorney, Agent, or Firm*—Morgan, Finnegan, Pine, Foley & Lee

[57] ABSTRACT

Apparatus for inserting a core member for an electrochemical cell into an open-ended cell casing, including: casing support means; a collet assembly comprised of annular segments movable relative to each other so as to fix the dimension of the perimeter of an interior guiding surface, the guiding surface preferably being radially inwardly tapered; and means for advancing the core member through the collet assembly and into the casing. The apparatus also comprises means for controlling the position of the annular segments of the collet assembly selectively to increase or decrease the perimeter of the guiding surface.

14 Claims, 5 Drawing Figures

APPARATUS FOR ASSEMBLING ELECTROCHEMICAL CELL

BACKGROUND OF THE INVENTION

This invention relates to apparatus for inserting a core member into an open-ended casing, particularly in situations where a close fit or tolerance is desired between the casing and the core member. The apparatus is particularly useful in the manufacturing of electrochemical cells where a coiled electrode assembly must be inserted into a cell casing.

In the assembling of electrochemical cells, particularly sealed cells contained or housed in an electrolyte-impervious casing, it is the usual practice first to make up an electrode assembly and then place this electrode assembly in the cell casing. The external terminals for the cell are provided either prior to or after the electrode assembly is placed into the casing.

A typical electrode assembly is comprised of at least one positive electrode plate and at least one negative electrode plate spaced-apart by intermediate separator layers which contain an absorbed electrolyte. Except for high-capacity battery cells, the electrode assembly usually takes the form of a cylindrical unit comprised of spirally wound positive and negative electrode plates, together with the interleaved separator layer. This coiled electrode assembly is inserted into the casing, terminal connections provided between the electrode plates and the external cell terminals, and the casing sealed to form the finished product or subassembly.

With certain types of cells, e.g., nickel-cadmium cells, the electrode assembly can be inserted into the casing without excessive difficulty owing to the stability of the coiled electrode assembly once it is formed. That is, the nickel-electrode plates, once wound, have a substantial degree of structural integrity, and the separator material used with these cells is also strong and not easily damaged.

In the case of other types of cells, however, such as small sealed lead-acid cells, the lead electrodes are rather soft, and the separator material often is a very fragile fibrous substance. For example, separators cut from a fibrous glass mat are vulnerable to damage upon contact with a hard irregular surface. Should such damage occur as the electrode assembly is being placed into the cell casing, electrical shorting or other operational performance anomalies can result.

A second and related problem in assembling lead-acid cells using soft separator material is the difficulty of achieving a sufficiently tight fit of the electrode assembly inside the casing so as to preclude rattling and/or vibration during use. It is desirable, from the point of view of structural integrity of the cell, to maintain the closest practicable tolerance between core and casing to reduce, or even eliminate, unwanted movement and ultimate loosening and separation of the coiled electrodes and intermediate layers inside the finished cell. In the past, however, it was difficult to achieve solutions to both of these problems. This is because the casings have been generally oversized for two reasons: first, in order to avoid inadvertent damage to the electrode assembly during its insertion into the casing and, second, in order to accommodate tolerance variations in the diameter of the electrode coil. The use of oversized casings is generally incompatible with the achievement of the desired close fit between the electrode coil and casing.

Among the objects of the present invention are to meet and solve the foregoing difficulties in the assembly of electrochemical cells, and to provide improved apparatus which may be used to insert a core member into a casing under varying conditions of tolerance.

SUMMARY OF THE INVENTION

The invention achieves the foregoing objectives by apparatus comprising support means for the casing, a collet assembly providing a guiding surface for the core member, and means for advancing the core member through the collet assembly such that the guiding surface engages and guides the core member during its advancement.

In the preferred embodiment, the collet assembly comprises a plurality of mutually spaced tubular, or annular, segments which together form a ring conforming to the perimeter of the core to be received thereby, and the guiding surface is inwardly tapered so as to size the core member, if necessary, as it is being inserted. In addition, the preferred embodiment incorporates means for moving the rim surrounding the open end of the casing into aligned engagement with the underside of the collet assembly so that the core member enters the casing immediately upon leaving the guiding surface.

A clearer understanding of the invention and the nature of the apparatus will be had by referring to the drawings and to the following detailed description.

DETAILED DESCRIPTION OF PREFERRED EMBODIMENT

Figure 1:
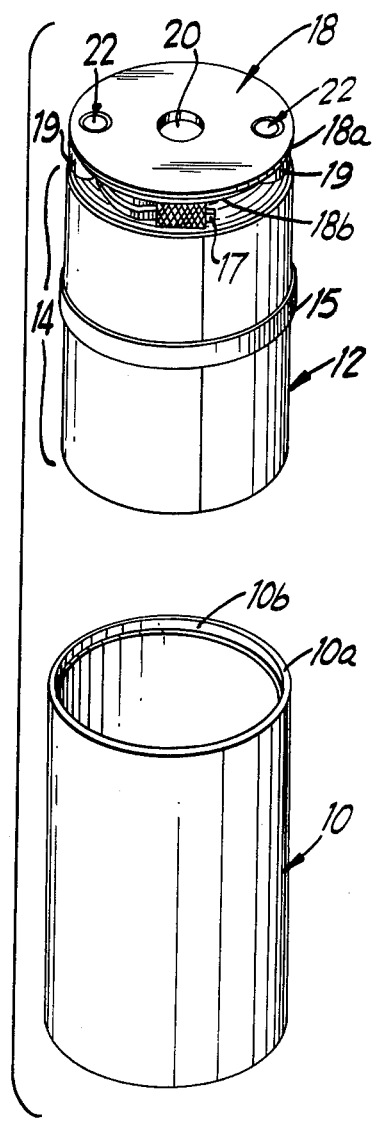
FIG. 1 is an exploded perspective view illustrating a casing for a sealed electrochemical cell and the electrode core assembly which is to be received by the casing.

Before describing the preferred embodiment of the invention, it will be useful to examine some elements of a typical electrochemical cell to better understand the nature of the problem to which the invention is directed. Turning to FIG. 1, a plastic casing 10 and an electrode core assembly 12 for such a typical sealed electrochemical cell are shown. Though not shown in detail, the electrode assembly 12 includes an electrode coil 14 comprising a negative electrode, a positive electrode and interleaved separator layers, all wound together into a closely packed coil. An adhesive tape 15 wrapped about the convolutions of the coil 14 secures them against unravelling. At the top of the coil 14 is a pair of terminal posts; a portion of one post 17 is visible. This post 17 is welded to a tab which extends from the top edge of one of the electrode plates. Another post (not visible) is similarly welded to a tab extending from the upper edge of the other electrode. A plastic cover 18, having cylindrical portions 19 extending from its underside and having a resealable vent mechanism 20, overlies the electrode coil 14. The cylindrical portions 19 include recesses adapted to receive the ends of the terminal posts 17, these ends also being fastened at 22 to the terminal post so as to secure the cover 18 to the electrode coil 14.

Cover member 18 is formed with a flange 18a which is undercut or beveled to a rim portion of smaller diameter. The rim portion 18b is received in a recess 10b in the casing, with the upper flange 18a overlying the top of the rim 10a of the casing when the electrode assembly is fully inserted. The cover 18 is usually then ultrasonically welded to the casing 10 at the rim to provide a sealed inner container. Generally, this sealed unit is housed in a second casing made of metal in order to provide mechanical integrity to all components. An electrolyte may be added to the cell prior to sealing or, after sealing, by introducing it through the resealable vent mechanism 20. A more complete description of the cell, which forms no part of this invention per se, may be found in a publication entitled, User's Guide, Rechargeable Sealed Lead Acid Battery (1977) available from General Electric Company, Battery Business Department, Gainesville, Fla.

As noted above, problems inherent in the assembly of such sealed electrochemical cells have been the potential damage which can occur to the outer convolutions of the electrode coil 14 during its placement into the casing, and the necessity of providing an oversize plastic casing 10 in order to accommodate electrode coils of varying size due to the difficulty in accurately winding up the coil to a given diameter. These problems are eliminated by the apparatus now to be described.

Figure 2:
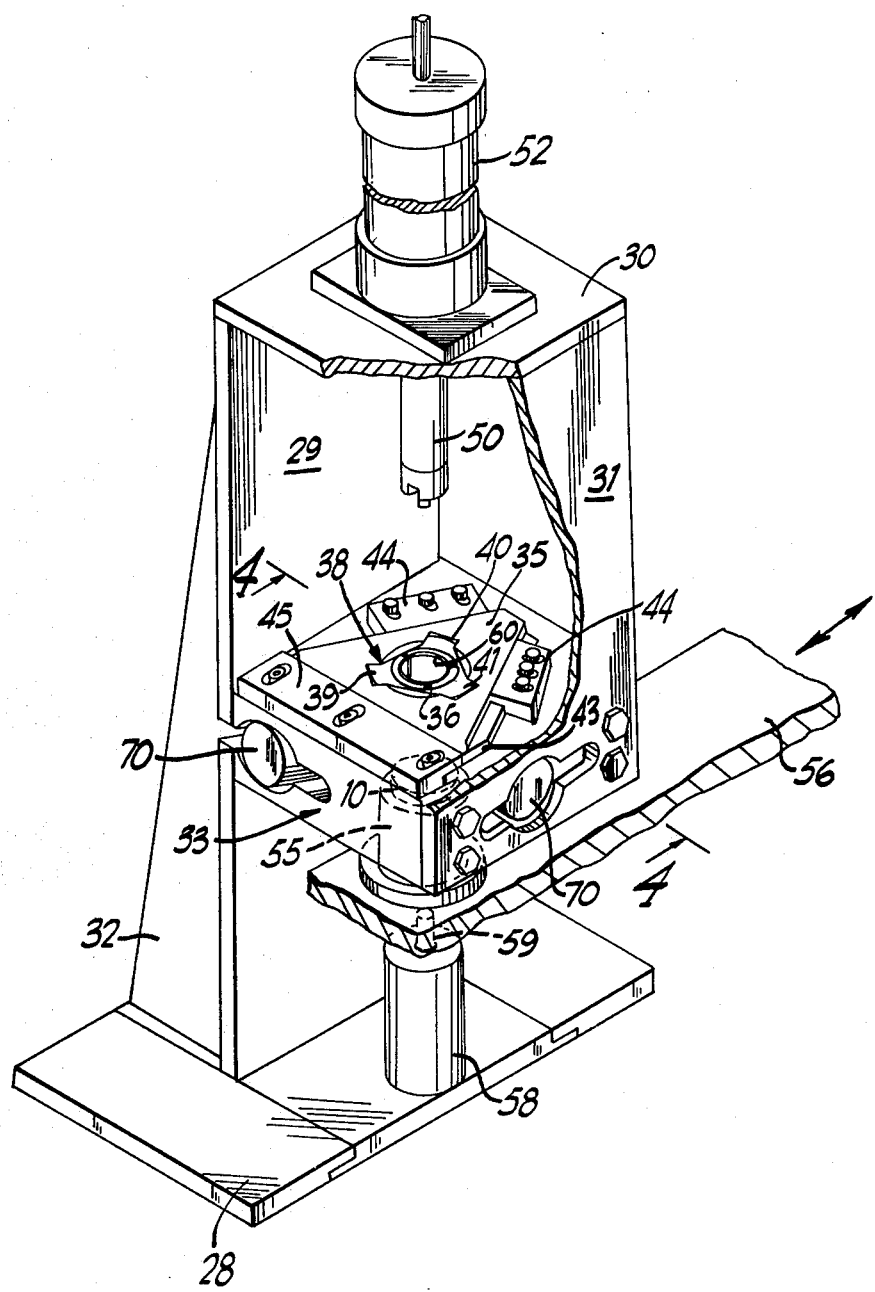
FIG. 2 is a perspective view, partially cut away, of the apparatus constructed in accordance with the invention.

Referring to FIG. 2, the apparatus includes a base 28, a back frame member 29, a top frame member 30 and a front frame member 31. Each of these frame members is constructed of solid steel plate. Triangular-shaped bracing supports 32 are welded to the base 28 and back frame member 29. It should be understood that, while the invention is described with reference to a stationary and separate unit, the principles and components it embodies can be incorporated into an operational station of an automated assembly line.

Supported between the front and back frame members 29, 31 is a support block 33 which carries, at its top surface, a collet unit consisting of a collar plate 35 having a central aperture 36 in which a collet assembly, designated generally at 38, is mounted. The collet assembly, in turn, is comprised of three closely spaced annular, or tubular, segments 39, 40, 41 which are pivotally mounted by pivot pins 42 (best seen in FIG. 4) in the collet collar plate 35.

Collar plate 35 is generally triangularly shaped, having edges provided with bosses, or ridges 43, adapted to be engaged by clamps 44, 45, screwed or bolted to the support block 33. Each of the clamps 44, 45 is slotted so that the entire plate 35 may be easily aligned with the operational axis of the apparatus.

The annular interior surface formed by the three segments 39-41 of collet assembly 38 constitutes a guiding surface for the electrode assembly to be inserted into the casing, and the electrode assembly is advanced through the collet assembly by a stuffer rod 50 upon actuation of an air cylinder 52 mounted to the top frame plate 30. It should be apparent that when the air cylinder 52 is actuated, the stuffer rod 50 moves downwardly into engagement with the electrode core 12 and thereafter continues to move downwardly to push the core 12 through the collet assembly 38.

Figure 3:
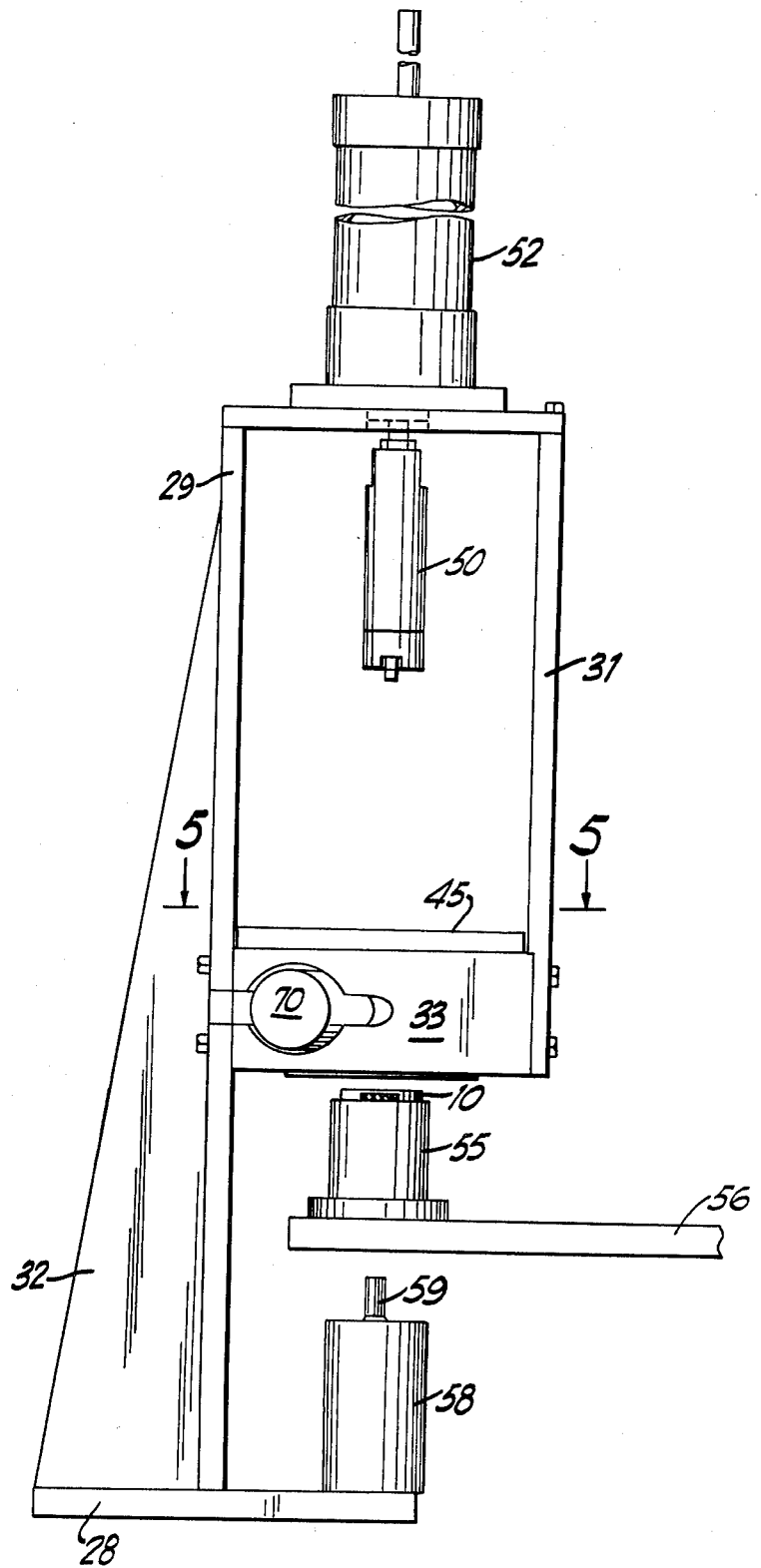
FIG. 3 is a side elevation view of the apparatus.

Underneath the collet assembly 38 and axially aligned therewith is casing support means, including a casing holder 55 mounted on support 56, and casing advancing means comprising an air cylinder 58 and its piston 59. This piston 59 is movable upwardly so as to engage, directly or indirectly, the bottom of the casing 10 and position the open end of the casing immediately below the collet assembly. In this position, the casing 10 is ready to receive the electrode core assembly as it is advanced through the collet assembly 38 under force supplied by the stuffer rod 50. The axial alignment among the air cylinder 58, casing holder 55, stuffer rod 50 and the collet assembly 38 is perhaps best seen in the side elevational view of FIG. 3. Support plate 56 for the casing holder 55 is movable by an appropriate mechanism (not shown) so that the casing holder 55 is accessible to the operator who places the empty casing 10 into the tapered cylindrical opening in the holder 55. Of course, an automatic loader may be used for this function.

Figure 4:
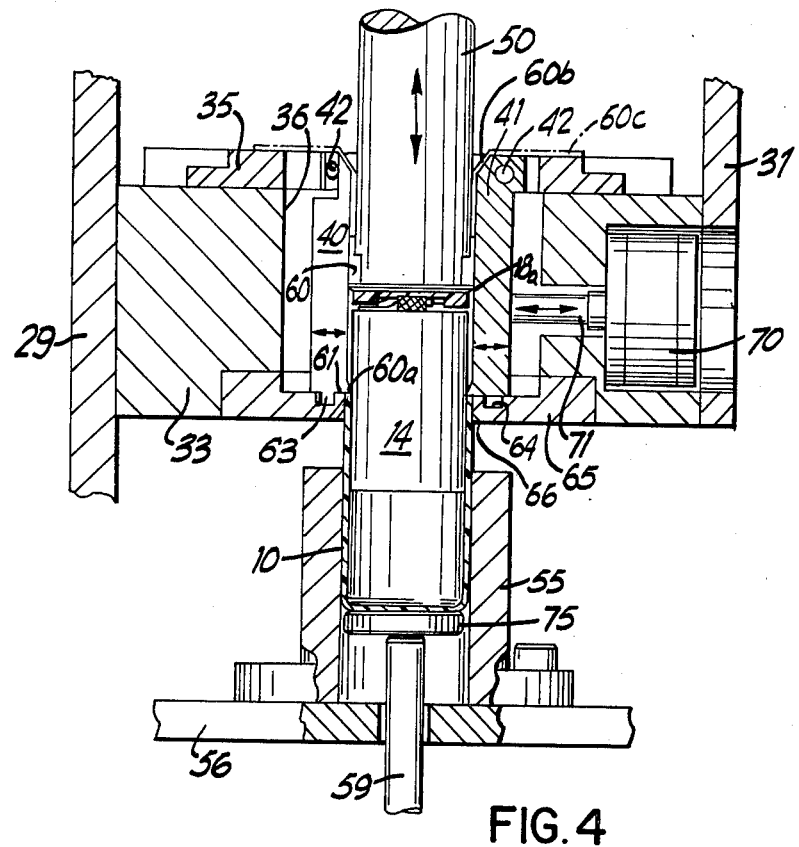
FIG. 4 is a cross-sectional view taken along the line 4—4 in FIG. 2.
Figure 5:
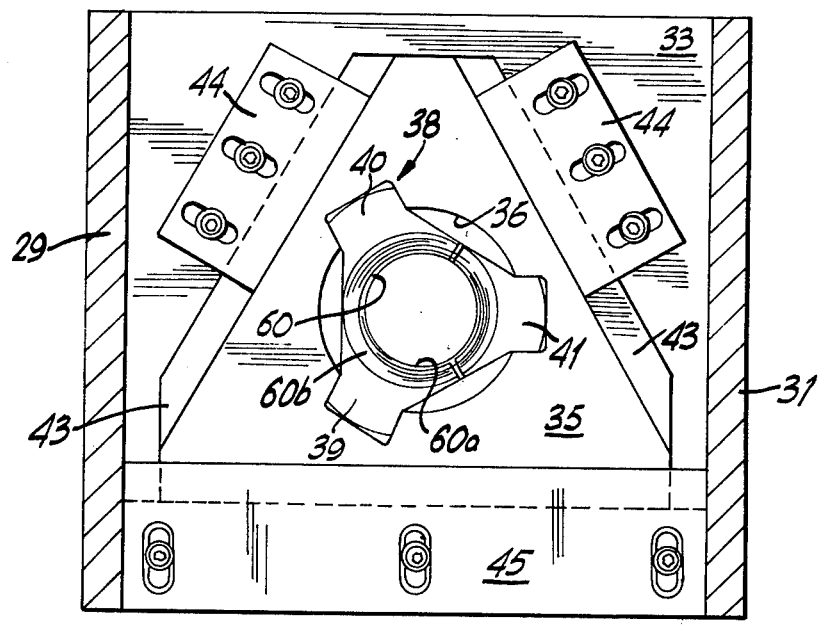
FIG. 5 is a plan view, in partial cross-section, taken along the line 5—5 in FIG. 3.

The foregoing operation of the apparatus, together with the details of the collet assembly, is best appreciated from FIGS. 4 and 5. Collet segments 39-40, provide an annular interior guiding surface 60 for the electrode assembly 12. This guiding surface 60, at its lower end 60a, is inwardly tapered in the radial direction so that the perimeter of the guiding surface corresponds to the desired dimension and shape of the electrode assembly 12 to be forced into the casing 10. At their upper portions, the segments, provide a beveled surface 60b so as to assist guiding the electrode core 12 into the center of the collet assembly and to ensure avoidance of separator damage. If desired, a plurality of flexible low-friction fingers 60c (shown in phantom lines) may be affixed to the plate 35 so as to overlie beveled surface 60b and provide an even lower friction guiding surface at the top of the collet.

The underside of each of the segments 39-41 terminates in a surface 61 which is generally perpendicular to the guiding surface. Protruding from this undersurface 61 of each of the segments 39-41 is a lug 63. Lugs 63, in turn, are received in an annular recess 64 formed in a plate 65 at the bottom of the support block 33. The radial dimension of the annular recess 64 is larger than the corresponding dimension of the lugs 63, the recess defining mechanical stops for the inward and outward radial motion of pivoted segments 39-41. Plate 65 is also formed with a beveled cylindrical aperture 66 which guides and positions the open end of the casing in axial alignment with the collet segments. It may thus be seen that each of the annular segments is movable over a finite distance defined between the inner and outer walls of the recess 64. These segments pivot in the radial direction shown by the arrows in FIG. 4.

To the end of controlling the radial position of the lower tapered surface 60a of the annular collet segments, controllable air cylinders 70 are used. There is one air cylinder 70, recessed into block 33, associated with each of the segments 39-41. Each cylinder 70 in turn has a movable piston 71 for engaging and moving its associated annular segment (see FIG. 4).

In operation, the apparatus functions as follows. Casing 10 is placed manually or automatically into the casing support means 55, which is brought into alignment with the collet assembly and stuffer rod 50. The air cylinders 70 are then actuated so as to move the piston 71 into engagement with the annular collet segments 39-41. These segments move radially inwardly until the lugs 63 engage the innermost wall of the recess 64, this wall serving as a limit stop, as previously mentioned. When the segments 39-41 are in this position, their undersurfaces 61 protrude slightly into the central recess at the center of the collet assembly, as shown in FIG. 4. The air cylinder 58 is thereupon energized, causing its piston 59 to move upwardly into the center of the casing holder 55 where it acts upon the bottom of the casing 10 by means of the intermediate spacer 75. Casing 10 is thereupon moved upwardly until the rim surrounding the open end of the casing moves into positioning aperture 66 and abuts the undersurface 61 of the collet segments. Casing 10 is now precisely located to receive the electrode core. It will be observed that the inwardly tapering guiding surface 60a at the lower end of the collet assembly is dimensioned to correspond nearly precisely with the interior dimension of the casing 10. The core assembly 12 is now ready to be inserted in the casing.

Core assembly 12 is manually or automatically placed into the center of the collet assembly where it may be guided downwardly by guiding surface 60. Next, air cylinder 52 is actuated so as to move the stuffer rod 50 downwardly into engagement with the cover 18 and push the entire core 12 downwardly into the casing 10. FIG. 4 shows the electrode coil 14 partially inserted into the casing 10. As the stuffer rod continues to move downwardly, the rim portion 18a of the cover ultimately will reach a point where it would engage the tapered portion 60a of the guiding surface and be stopped or deformed by it. At this point in the movement of the core assembly, however, the pressure is released from air cylinder 70 so as to permit the collet segments to move radially outwardly to accommodate the increased dimension of the cover rim 18a. In this manner, the collet assembly automatically accommodates the increased dimension of the cover and may be made synchronously operable therewith by the provision of suitable mechanical or electrical position sensors, such as air valves or microswitches, photoresponsive cells, and the like. These sensors respond to the position of the stuffer rod 50 or core 12 and cause the pistons 71 of the air cylinders 70 to automatically release at the appropriate time.

In sum, the apparatus provides means for inserting a core member into the casing automatically, and in a manner such that the varying radial dimensions of the core member may be accommodated. Furthermore, the inwardly tapered guiding surface of the collet assembly functions as a sizing means for the core member. That is, since the core is slightly resilient the collet can be made to apply inward pressure on the core and compress it somewhat as it is moving downwardly, thereby assisting in the attainment of an improved close fit between the casing and core. It has been found that the invention eliminates the earlier described difficulties experienced in the assembly of sealed lead-acid cells which, in the past, have suffered from damage and/or excessive movement and vibration between the coiled electrodes and the casing.

Although the invention has been described with reference to a particular embodiment, as well as with reference to a particular type of sealed electrochemical cell, it will be apparent that certain modifications and variations can be made without departing from the spirit and scope of the invention. For example, other means might be used to apply radial pressure to the elements of the collet assembly and, of course, various types of mechanical stops through other controls could serve the function of positively positioning the guiding surface. It will be equally apparent that the guiding surface need not be cylindrical or conical in form, but may take other geometric configurations. All such modifications and variations are intended to be included within the scope of the appended claims.

What we claim is:

1. Apparatus for inserting an electrode assembly core into a casing for an electrochemical cell, comprising:
   support means for the casing, the casing having an open end for receiving the core;
   a collet assembly comprised of a plurality of closely spaced tubular segments which together form a smooth, substantially continuous ring conforming generally to the perimeter of the core to be inserted,
   said casing support means being disposed to position the open end of the casing proximate to and in axial alignment with an exit end of said ring,
   said ring being inwardly tapered to engage and guide the perimeter of the core into the casing during passage of the core through the collet assembly,
   said tapered guiding surface being movable radially inwardly and outwardly for selectively altering the dimension of the perimeter defined thereby;
   means for mounting said collet assembly in fixed relation to said casing support means;
   controllable mechanical stop means for restricting the radially outward movement of the guiding surface to a first radial dimension, during one portion of the travel of the core through the collet assembly, and to a second radial dimension during another portion of the travel of the core through the collet assembly,
   core stuffer means for axially pushing the core through the collet assembly and into the casing; and
   means responsive to the axial location of the core for controlling the mechanical stop means.

2. The apparatus of claim 1, further comprising:
   means associated with the casing support means for urging the open end of the casing axially into engagement with the collet assembly adjacent the guiding surface thereof.

3. The apparatus of claim 2, wherein:
   said spaced tubular segments terminate in an undersurface generally perpendicular to the axis of the guiding surface, said casing support means being operative to urge the rim at the open end of said casing into abutment with said undersurface when in position to receive the core.

4. The apparatus of claim 2, wherein:
   said casing support means includes a generally tubular support having an inwardly tapered surface at an open end thereof, said tapered surface engaging and guiding the casing as it is moved axially therethrough toward said collet assembly.

5. The apparatus of claim 1, wherein said mounting means includes a collet support element defining a passage for receiving said tubular segments,
   each of said tubular segments of the collet assembly being pivotally mounted in said support element at a point remote from the inwardly tapered guiding surface so as to permit radially inward and outward movement thereof.

6. Apparatus for inserting a core into a casing having an open end, the core having a closure member associated therewith adapted to overlie the rim at the open end of the casing when the core is fully received therein, comprising:

support means for the casing:

a collet assembly having a plurality of mutually spaced tubular segments which together form a ring surface conforming to the perimeter of the core, said support means locating said casing to maintain alignment between said ring surface and the casing rim;

said ring surface being inwardly tapered for engaging and guiding the perimeter of the core during its passage through the collet assembly, said tapered guiding surface being movable radially inwardly and outwardly for selectively altering the dimension of the perimeter defined thereby;

core stuffer means having an axially movable element for engaging and thereby advancing the core through the collet assembly and into the casing; and actuator means engaging said tubular segments for mechanically locating the radial position of the guiding surface during insertion of the core, said actuator means being controllably operable in synchronism with the axial location of the core stuffer means substantially independently of any mechanical forces exerted by the core upon the tapered guiding surface to permit radially outward movement of said collet assembly segments upon substantially complete insertion of the core but prior to engagement of the closure member by the inwardly tapered guiding surface.

7. Apparatus for inserting a core member into a casing having an open end for receiving the core member, the dimension of the perimeter of the core member varying along the axial direction thereof, the apparatus comprising:

a collet assembly forming a guiding surface engaging the core member and having a perimeter conforming to the geometry of the perimeter of the core member, said guiding surface being generally aligned with the rim formed at the open end of the casing, casing support means for holding the casing so as to maintain the casing rim and guiding surface in axial alignment;

said collet assembly comprising at least two annular segments radially positionable relative to each other so as to alter the dimension of the perimeter of said guiding surface;

means for engaging and thereby axially advancing the core member through the collet assembly into the casing; and means synchronized with the axial location of the core member advancing means relative to the collet assembly for controlling the radial position of said annular segments substantially independently of radial mechanical forces exerted upon said guiding surface by the core member, thereby selectively to alter the dimension of the perimeter of the guiding surface to accommodate the varying dimension of the perimeter of the core member during its passage through the collet assembly.

8. The apparatus of claim 7, wherein the position controlling means includes:

actuator means for exerting radially directed pressure on said segments, and means providing a fixed mechanical stop which is engaged by said segments when moved radially by the pressure exerted by said actuator means.

9. The apparatus of claim 8, wherein:

said annular collet segments are pivotally mounted such that the guiding surface provided thereby is selectively movable radially inwardly and outwardly.

10. The apparatus of claim 9, wherein the apparatus further comprises:

a support block having an aperture therethrough, a support collar for supporting said pivotally mounted collet segments, the said collet segments providing radially positionable end portions extending into the aperture in said support block; and means associated with said support block adjacent the radially positionable end portions of said collet segments for receiving and positioning the open end of the casing in alignment with said guiding surface.

11. Apparatus for inserting into an electrochemical cell casing open at one end an electrode core having an enlarged section at one end thereof, the apparatus comprising:

a collet assembly comprised of a plurality of closely spaced tubular segments;

means supporting said collet assembly in fixed relation to the casing;

said collet segments defining a substantially continuous tubular guiding wall having a relatively wide wall portion at a core receiving end thereof adapted to engage the enlarged section of the core, and a relatively narrow portion at a core exiting end thereof adapted to engage and guide the non-enlarged portion of the core, said tubular segments being radially movable outwardly for selectively increasing the transverse dimension of said narrow portion of the tubular wall;

means for supporting the casing so that the open end thereof is adjacent the core exiting end of the collet assembly and axially aligned therewith;

means for engaging and thereby axially advancing the core through the collet assembly and into the casing; and controllable means synchronized with the movement of the core advancing means relative to the collet assembly and operable substantially independently of any radial forces exerted by the core member upon the guiding wall for permitting said tubular segments to move outwardly when the enlarged section of the core is in approximate registration with the narrow portion of the guiding wall, thereby to allow the enlarged portion of the core to pass through said collet assembly without impediment.

12. The apparatus of claim 11, wherein: said segments are pivotally mounted on the collet support means at the wide wall portion thereof so as to permit radially inward and outward movement of said segments at the narrow wall portion thereof.

13. The apparatus of claim 11, wherein said segments are movable between a first, radially inward position and a second, radially outward position, the apparatus further comprising:

stop means associated with said support block and engageable by said segments for limiting the inward travel of said segments; and actuator means normally biasing said segments against said stop means in the radially inward position, and being selectively operable to permit said segments to move radially outwardly during passage of the enlarged section of the core through the narrow portion of the guiding wall.

14. Apparatus according to claim 11, further comprising:
 a casing-receiving recess defined in said support means adjacent the core exiting end of said collet assembly,
 said casing support means positioning the open end of the casing in the casing-receiving recess.

* * * * *